US006907833B2

United States Patent
Thompson et al.

(10) Patent No.: US 6,907,833 B2
(45) Date of Patent: Jun. 21, 2005

(54) FURROW CLOSING WHEEL FOR AGRICULTURAL SEEDERS AND MOUNTING SYSTEM THEREFOR

(76) Inventors: Keith D. Thompson, 934 S. 4th St., Osage City, KS (US) 66523; Benjamin K. Thompson, 934 S. 4th St., Osage City, KS (US) 66523

( * ) Notice: Subject to any disclaimer, the term of this patent is extended or adjusted under 35 U.S.C. 154(b) by 0 days.

(21) Appl. No.: 10/348,649

(22) Filed: Jan. 21, 2003

(65) Prior Publication Data

US 2004/0139895 A1 Jul. 22, 2004

(51) Int. Cl.[7] ................................................ A01C 5/06
(52) U.S. Cl. ...................................................... 111/192
(58) Field of Search ........................ 111/109, 190–195, 111/121; 172/540, 556, 766, 769, 765, 772.5, 772, 535, 538

(56) References Cited

U.S. PATENT DOCUMENTS

| | | | | |
|---|---|---|---|---|
| 2,924,189 A | * | 2/1960 | McLeod | 111/187 |
| 4,438,710 A | * | 3/1984 | Paladino | 111/109 |
| 5,269,237 A | * | 12/1993 | Baker et al. | 111/121 |
| 5,443,023 A | | 8/1995 | Carroll | 111/191 |
| 5,477,792 A | * | 12/1995 | Bassett et al. | 111/121 |
| 5,497,717 A | | 3/1996 | Martin | 111/191 |
| 5,896,932 A | | 4/1999 | Bruns et al. | 172/556 |
| 5,970,891 A | | 10/1999 | Schlagel | 111/135 |
| 6,119,608 A | | 9/2000 | Peterson et al. | 111/192 |
| 6,314,897 B1 | | 11/2001 | Hagny | 111/192 |
| 6,530,334 B2 | * | 3/2003 | Hagny | 111/189 |

OTHER PUBLICATIONS

Photo Sheets labeled "Angled Close Wheel 1" and "Angled Close Wheel 2" showing a closing wheel of Yetter Mfg. Co., Inc. dated Oct. 21, 2002.
Photo Sheet labeled "P:\10IN RM SEALER\Image03.jpg" showing a closing wheel referred to as the "John Deere Memphis Closing Wheel" dated Feb. 5, 2001.
Unpublished Drawing Sheet No. X4441–12 of Yetter Mfg. Co., Inc. dated Apr. 3, 2001.

* cited by examiner

Primary Examiner—Robert E Pezzuto
(74) Attorney, Agent, or Firm—Jeffrey L. Thompson; Thompson & Thompson, P.A.

(57) ABSTRACT

A furrow closing wheel for an agricultural seeder has a center body portion and spokes extending radially outwardly from the body portion. The spokes each have a base attached to the body portion and a blunt tip located radially outwardly thereof. The blunt tip of each spoke has a circumferential length which is 1 to 6 times larger than a thickness of the blunt tip. The spokes each have a substantially constant thickness of about 0.1 to 0.5" from the base to the blunt tip, and are tapered such that a circumferential length of the base of each spoke is 1.5 to 5 times larger than the circumferential length of the blunt tip. The spokes are 0.8 to 1.8 inches long in a radial direction from the base to the blunt tip. A mounting system having a protective shroud is provided for mounting the furrow closing wheel to the seeder.

23 Claims, 3 Drawing Sheets

FURROW CLOSING WHEEL FOR AGRICULTURAL SEEDERS AND MOUNTING SYSTEM THEREFOR

BACKGROUND OF THE INVENTION

1. Field of the Invention

The present invention relates generally to agricultural seeders that produce open furrows in the soil into which seeds are placed, and more particularly, to an improved furrow closing wheel for use with such seeders for closing a furrow in which seeds have been placed.

2. Description of the Prior Art

Agricultural planting methods continue to evolve in response to widespread adoption of crop production techniques with greatly reduced dependence on tillage of the soil ("no-till" or "reduced-till"), and in which the new crop's seeds are often placed directly into the previous crop's stubble or crop residues. No-till or reduced-till seeding differs greatly from seeding into a tilled seedbed. The soil conditions for no-till seeding are typically wetter than those dried by tillage, due to the mulching effect of the crop residue remaining on the soil surface. Wetter soils are more prone to compaction by implements traveling over or engaging the soil. No-till soils are also typically more structurally stable than tilled soils, as the soil particles are "aggregated" or held together by old roots, fungi, and other organic substances and molecular attractions binding the particles together. Agricultural seeders operating in no-till conditions are often equipped and adjusted to employ more down-pressure, either via coil spring or hydraulics, on the furrow opening blades to aid in the slicing of old crop residues and to assist in the penetration of this more structured soil. The extra down-pressure on the opener disc and depth-gauging wheel often results in more compaction of the furrow sidewall.

Especially in no-till or other wet conditions, some difficulties are encountered when attempting to draw soil back into the furrow, which is desirable to protect the newly placed seeds from drying winds and sun, to protect from, predation, to allow for proper seedling development, and to improve seedling uniformity of growth. In tilled soils, the prior art was to employ packing wheels rearward of the furrow openers. The packing wheels operated to both close the furrow and to do some amount of packing, since in the loose and dry conditions of tilled soils a considerable amount of packing is desirable to assist the seed in drawing moisture from below the seed.

In no-till seeding, the wetter and more structured soils generally prevent packing wheels from performing adequately. The sidewall of the furrow formed in no-till seeding does not crumble easily like the sidewall in the tilled conditions, where the soil had previously been loosened and fluffed by tillage. Accordingly, very high pressures are sometimes applied to the packing or closing wheels in an attempt to squeeze the furrow sidewalls back together. This typically results in poor seedling emergence because the soil in the furrow is more compressed at the surface compared to near the seed, even to the extent of having a void immediately above the seed but with extremely compressed soil at the surface. In this instance, seed germination may fail due to the drying of air in the void, or the seedling may leaf underground in the void, or the seedling will encounter great difficulty pushing itself through the dense layer of soil, which will slow and weaken the seedling or even kill it.

Some improvements have been made by separating the seed firming and furrow closing functions. This is typically only possible where the depth-gauging function is already accomplished independently of the packing or closing wheel, as in the configuration where depth-gauging wheels travel alongside the furrow opening discs. Seeds are firmed into the soil in the bottom of the furrow by a narrow rolling wheel or sliding-type firmer exerting a small amount of pressure onto the seed after it has been placed by the furrow openers and seed-directing tube. Since the closing wheel is now relieved of its packing function, the preferred method of closing furrows in no-till has diverged from smooth wheels toward spoked or tined wheels as being better suited to crumbling the more resilient sidewalls of the furrow that occur in no-till conditions.

Several spoked closing wheel types have been invented, as shown, for example, in U.S. Pat. No. 5,443,023 issued to Carroll, U.S. Pat. No. 5,497,717 issued to Martin, U.S. Pat. No. 5,896,932 issued to Bruns et al, and U.S. Pat. No. 5,970,891 issued to Schlagel. Experience has taught that the results vary widely depending on the exact geometry and configuration of the spokes on such a wheel, as well as the angles at which the spokes engage the soil.

Some spoke designs inherently do a great deal of packing of the soil above the seed, which is generally undesirable and was a major reason for the departure from smooth closing wheels. Certain other designs penetrate the soil all too well, and too deeply, and have a pronounced tendency to lift and 'chunk up' the sidewall and disrupt seed placement. Yet another problem of many prior art designs is the tendency to accumulate mud, corn stalks, corn cobs, or other debris, often to the extent of clogging the wheel and arresting its rotation, or to the lesser degree of filling the places between the spokes and eliminating the effectiveness of the wheel for furrow closing. Altering the angles at which the spokes engage the soil will alleviate some of the effects of sidewall lifting, such as taught by Hagny, U.S. Pat. No. 6,314,897, although the design of the spoked wheel itself remains a crucial component in obtaining good results in sidewall breakage and avoiding mud accumulation.

In particular, Schlagel and Carroll were designed to do considerable packing of the soil, and do in fact achieve this. This is obtained by relatively large surfaces of the spoke contacting the soil, and forcing this surface into the soil with a combination of weight and spring pressure. Carroll's spoke has a rather large flat area initially contacting the soil, the tine being 0.75-inch wide, and with a curvature and directionality such that a considerable surface on the side of the leading edge of the tine contacts and compresses the soil. In field operation, the portion of Carroll's tine initially engaging the soil and being forced into the soil is approximately an area exceeding 1.0 inch$^2$. Carroll's design does a great deal of packing of the soil overlying the seed during its attempt to close the furrow, which was a stated purpose of the wheel, and no other seed firming device was contemplated by Carroll. Schlagel's design has still greater contact area, and is quite limited in its ability to penetrate the soil.

FIGS. 1 to 4 of Bruns depict spoked wheels with greatly reduced contact area, approximately 0.05 inch$^2$, although Bruns' spokes of "truncated cone" shape possess a significant enlargement of these two dimensions moving toward the spoke base from this initially small contact area. Spoked wheels embodying the Bruns patent, such as the "Star" wheel marketed by May-Wes Mfg. of Hutchinson, Minn., do indeed enter the soil much more readily than the quite blunt spokes taught by Carroll. Bruns discloses a wheel used for "furrow closing" without mention of the wheel supplying any seed firming action, apparently assuming such firming function would be accomplished by other methods—indeed, the industry was well on its way to widespread use of separate in-furrow firming devices by the date of Bruns' invention.

Similarly, Martin teaches a spoked wheel with its closing function separate from the seed firming action, which Martin envisioned as being accomplished with a trailing press wheel centered on the midline of the furrow to pack the soil behind the closing wheels. Accordingly, the closing wheel in Martin has an exceptionally small contact area, essentially zero with its "sharpened" spokes, which allows the spokes to easily enter the soil. As both Bruns and Martin contemplate seed firming accomplished by other means, those patents refocused attention on spokes that readily enter the soil, rather than some compromised blend of intermittent packing/crumbling.

Other attributes that determine the ease with which the spokes enter the soil are the length and tapering of the spokes. These attributes also play a major role in the depth to which the spokes penetrate. While it is desirable for spoked closing wheels to penetrate the soil easily initially, and to achieve some depth to break apart the sidewall, it is highly undesirable that the spokes achieve too much depth and disrupt seed placement. The wheel in FIGS. 1 to 4 of Bruns features spokes that taper sufficiently in two directions to limit depth effectively. Conversely, Martin teaches a closing wheel with spokes having parallel sides (with sharpened ends) and a length of 2.5 inches—the stated goal being to till the furrow sidewall to the depth of seeding. Experience has shown that wheels per this design can penetrate too deeply and disrupt seed placement, contrary to the claims of Martin. Indeed, the spoke attributes of Martin's wheel are better suited to row cleaning ahead of the opener, rather than furrow closing, and the wheel depicted in Martin's U.S. Pat. No. 5,497,717 is changed little if any from the row cleaning wheel Martin describes in U.S. Pat. No. 4,785,890.

Furrow closing wheels preferably provide considerable shattering action of the upper portion of the furrow sidewall to allow root development, while creating a consistent amount of 'fill' over the seed without an overabundance of air pockets or large clods. Attributes of the spoked wheel design affect this, including the geometry and length of the spokes as previously described, and also the proximity of the spokes to each other along the wheel's periphery. Generally, closely spaced spokes break up the sidewall more. Longer radial spokes tend to penetrate more deeply and to create more lifting action upon exiting the soil—lifting is typically undesirable as it increases the likelihood of disrupting seed placement as well as reducing control over the movement of the broken pieces of sidewall, i.e., churning and flinging the sidewall chunks, instead of shoving them directly into the furrow.

Another factor in the performance of spoked closing wheels is the ability to avoid clogging or accumulation of mud, straw, stalks, cobs, vines, and other materials commonly found in no-till fields, for the reasons stated earlier. Some prior art designs have experienced major problems with accumulation of mud and debris. By way of example, Carroll's design is capable of accumulating mud and old crop residues to such an extent as to require a pair of covering plates, as described in U.S. Pat. No. 5,645,000. The May-Wes "Star" wheel has problems with mud accumulation also, Bruns' recitation of the non-stick qualities of UHMW notwithstanding. Martin tends to have somewhat less problems with mud accumulation, due to the large open spaces between its spokes.

Prior art spoked closing wheels also have a tendency to accumulate vines of certain weed or crop species. These vines are carried up and around the wheel by the spokes, sometimes falling in toward the axis of the wheel and becoming lodged thereon. Additional vine accumulation causes tighter wrapping around the wheel axle or spindle, creating friction between the wheel and its support bracket, eventually to the point of stopping the wheel's rotation.

Still more shortcomings of prior art closing wheels pertain to the mechanical bearings and bearing housings for rotation of the wheel. Prior art closing wheels typically have rather small lightweight bearings or pairs of bearings with at least one face of one bearing exposed, which creates problems with water, liquid fertilizers, and dust corroding and abrading the seals and races, and eventually compromising the integrity of the seal. Bearing seizure and failure soon follow.

SUMMARY OF THE INVENTION

After extensive field testing of a wide array of constructions of the previously described attributes of spoked closing wheels, the Applicants developed an improved furrow closing wheel which is the subject of the present invention. The furrow closing wheel of the present invention solves the agronomic and mechanical problems of furrow closure in no-till seeding, as previously discussed.

The closing wheel of the present invention utilizes a spoke with a unique geometry and especially a very thin edge profile. As a result, the spoke readily slices into the furrow sidewall for consistent closing of furrows while shattering the sidewall of the furrow, without the packing or spearing action of previous designs. The thin edge profile also provides a greatly improved ability to avoid mud adhesion and accumulation. The spoke also has tapering sides and a limited length that create sufficient resistance to effectively limit the depth of the spoke. The shape of the spokes and their proximity creates a desirable crumbling of the furrow sidewall. The improved closing wheel of the present invention also includes a unique rotatable bearing configuration such that the bearing face is protected from liquids by a lipped shroud arrangement covering the bearing housing, which also serves in the attachment of bearings with oversize bores.

The Applicants' invention is a spoked furrow closing wheel with radial spokes that are blunt, with tapered sides, non-curved, having a relatively thin edge dimension of about 0.19 inch at both the tip and base, and being about 1.3 inches in length. The key to performance is the thinness of the closing wheel, although the various features are interrelated to some extent. The thin edge dimension of the invention permits the spoke to slice through the soil while encountering little resistance until penetrating to near the base of the spoke, whereupon resistance is markedly increased by the fragments of soil gathering between the spokes. The length of the spokes and their proximity to each other allow for optimum penetration and excellent breakage of the sidewall, while limiting their action to shallower depths. The tapering of the sides, together with the proper length of spoke, limits the lifting and flinging of chunks of sidewall. By these attributes, the invention functions to allow the furrow to be closed in a more consistent and agronomically acceptable manner. The more gentle and uniform closure results in improvements in percentages of seedlings emerging, more uniform temporal emergence, more rapid emergence, and improvements in seedling root development.

Another aspect of Applicants' invention is the ability to shed mud by virtue of the thin edge dimension of the wheel, while maintaining a high number of spokes for optimum sidewall breaking action.

Applicants' invention further includes a feature to greatly enhance the longevity of the bearing. Applicants have invented a durable shroud to cover one side of the bearing.

The Applicants' invention may be utilized as either single or multiple closing wheels per furrow, depending the configuration of the opener discs, the crop seeded, and the soil conditions.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Improved spoked furrow closing wheels for agricultural seeders according to preferred embodiments of the present invention will now be described in detail by reference to FIGS. 1 to 5 of the accompanying drawings.

Figure 1:
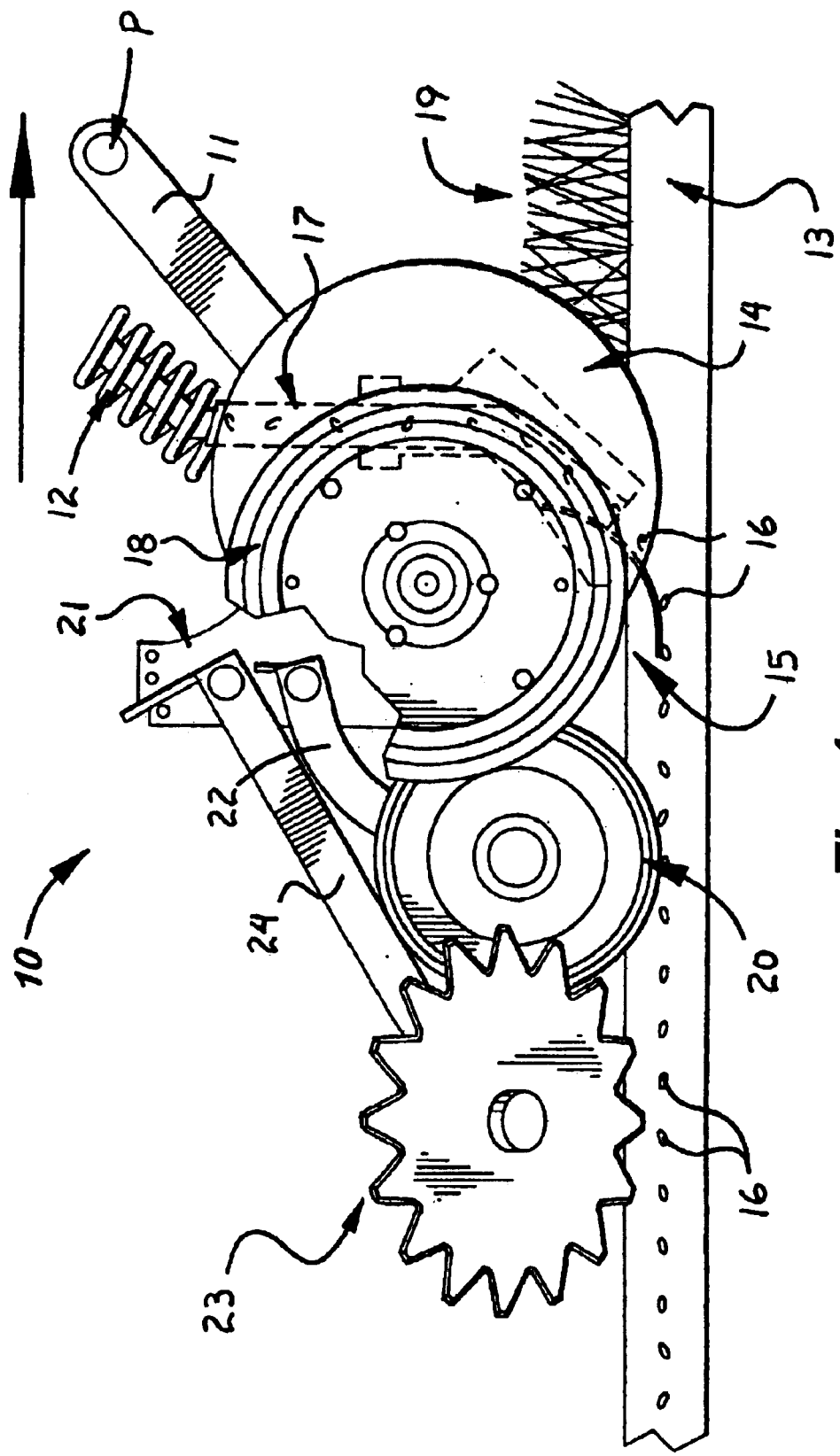
FIG. 1 is a side view of a row unit for an agricultural seeder having a spoked closing wheel according to the present invention.

FIG. 1 is a side view of a row unit 10 for an agricultural seeder, in this case a no-till drill. The row unit 10 is attached to the frame or toolbar (not shown) of the drill by a linkage 11 and pivot point P that allow the row unit 10 to move vertically when following undulations in the field. Coil springs 12, airbags, or hydraulic cylinders may be provided for transferring down pressure from the toolbar to the row unit 10 to better penetrate the soil 13. An opener disc 14, also known as an opener blade or coulter, is provided to pry open a furrow 15 in the soil 13 into which seeds 16 are dropped from a seed-directing tube 17.

The depth of the furrow 15 is controlled by a depth-gauging wheel 18 typically operating in the same plane as the opener disc 14 and immediately adjacent to and slightly rearwardly of the opener disc 14. The seed-directing tube 17 is typically located on the side of the opener disc 14 opposite the depth-gauging wheel 18. The seed-directing tube 17 serves to keep loose soil 13 and stubble 19 out of the furrow 15 while directing seeds 16 to the bottom of the furrow 15.

Operating almost immediately rearward of the seed-directing tube 17 is a firming wheel 20 or other device that is narrow enough to fit within the furrow 15 and that pushes the seeds 16 into the soil 13 at the bottom of the furrow 15. The firming wheel 20 is attached to the opener subframe 21 by a firming wheel arm 22 pivotally attached to the opener subframe 21 that lets the firming wheel 20 move vertically in a radial manner.

Rearward of the firming wheel 20 is a closing wheel disc 23 which is used to return part of the soil comprising the furrow sidewall into the furrow 15 and cover the seed 16. In the illustrated embodiment, the closing wheel 23 is supported by a closing wheel arm 24 which is attached to the opener subframe 21. Alternatively, the closing wheel arm 24 can be attached directly to the firming wheel stem, as disclosed in Hagny's copending U.S. patent application Ser. No. 09/865,911. The present invention is directed to the specific structure of the closing wheel disc 23 and an improved mounting system therefor.

Figure 2:
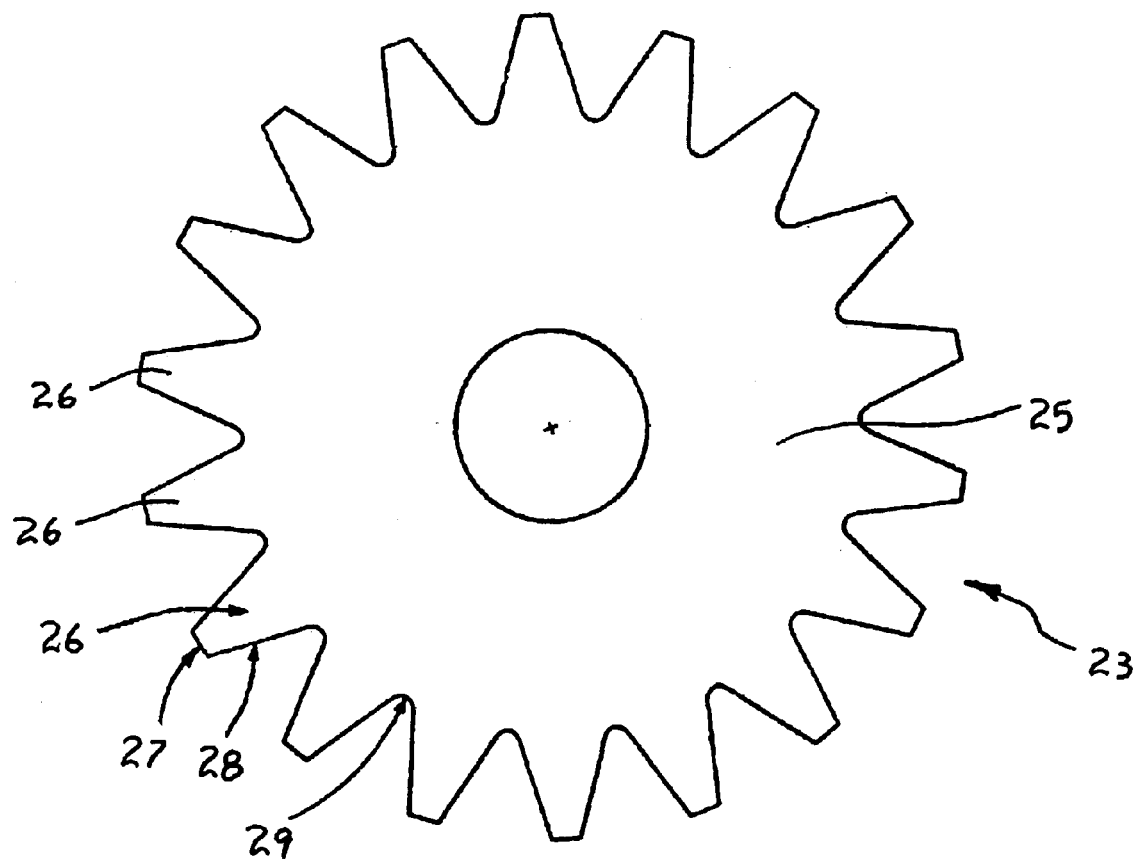
FIG. 2 is a plan view of the spoked closing wheel according to the present invention.

FIG. 2 is a plan view of the Applicants' closing wheel disc 23. The wheel disc 23 has a planar center body portion 25 and a plurality of spokes 26 extending radially outwardly from the center body portion 25. In the preferred embodiment, the wheel disc 23 is formed of a substantially flat plate having a constant thickness from the center body portion 25 to the tips 27 of the spokes 26. The spokes 26 are uniformly spaced along the periphery of wheel disc 23. In this particular embodiment, the spokes 26 total eighteen in number on a wheel disc 23 measuring 12.25 inches in diameter. The spokes 26 have tapering sides 28 that culminate in a base 29 which adjoins the tapering side 28 of the next adjacent spoke 26. For proper operation according to the present invention, there are preferably at least fourteen spokes 26 uniformly spaced on the periphery of the wheel disc 23.

Figure 3:
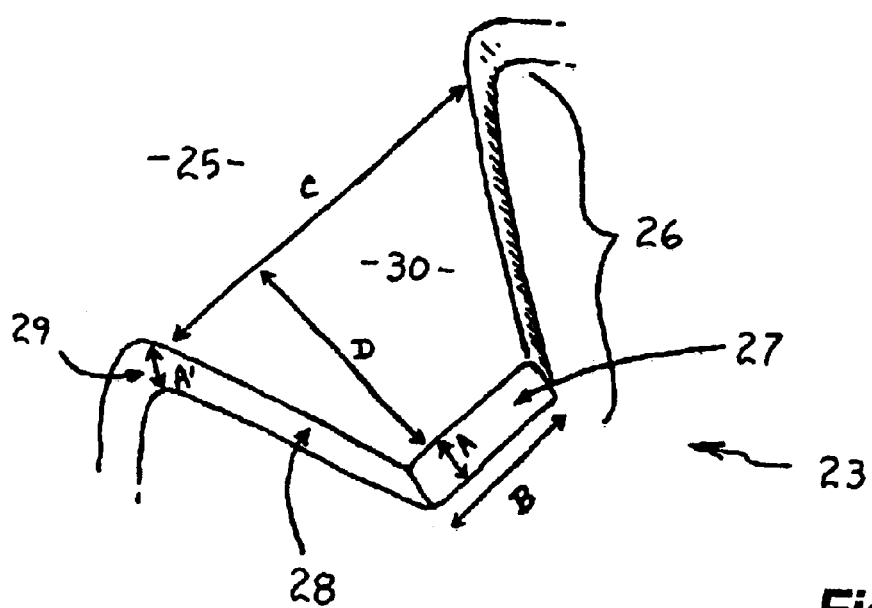
FIG. 3 is an elevated edge perspective view of a solitary spoke of the spoked closing wheel according to the present invention.

FIG. 3 depicts an elevated edge perspective of one of the spokes 26 on the wheel disc 23. The tips 27 of the spokes 26 each have a blunt configuration partially defined by a first thickness dimension A, which is measured perpendicular to the plane of the wheel disc 23 (i.e., parallel to an axis of rotation of the wheel disc). The blunt configuration of the spoke tip 27 is further defined by a first length dimension B, which is the measurement of the distance along the circumference of the wheel disc 23 occupied by the spoke tip 27. In this way, A×B is the cross-sectional area of the spoke 26 at the blunt tip 27.

The resistance any given spoke 26 encounters when entering the soil 13 will be governed not only by dimensions A and B of the blunt spoke tip 27, but also by the tapering increase (if any) in those dimensions moving toward the center body portion 25 of the wheel disc 23 from its outer periphery. In FIG. 3, a second thickness dimension A' is shown as the thickness of the spoke 26 at the base 29 of the spoke 26. In this instance, the second thickness dimension A' is approximately the same as the first thickness dimension A, i.e., the spokes 26 have a thickness which is substantially constant from the blunt tip 27 to the base 29.

A second length dimension C is shown in FIG. 3 as the broadness of the base 29, which is larger than the first length dimension B. Some increasing broadness from B to C will not significantly increase the resistance encountered by the spoke 26 due to the spoke's rotational path, i.e, even a non-tapering spoke with C=B would create a perforation in the soil 13 that is slightly elongated toward the soil surface, this elongation occurring in the direction of travel and being proportional to the length of spoke engaging the soil 13 as well as the diameter of the closing wheel 23. The Applicants' invention possesses spokes 26 with sufficient tapering to increase the resistance of the spoke 26 towards the base 29, i.e, the tapering more than compensates for the arc of travel described in the previous sentence, such that the sides 28 are pushing against the soil 13 during the spoke's rotation. This gradually increases resistance until the base 29 is reached, which dramatically increases resistance. Although friction of the soil 13 against the planar sides 30 of the spoke 26 does add some minor complication, as would varying the angles at which the wheel 23 operates, the primary determinants of the resistance encountered are the cross-section area A×B of the blunt tip 27, the thickness of dimension C, and to a lesser extent the tapering of dimensions from B to C.

Obviously, spokes having a small cross-section will enter the soil more easily, until some other depth-limiting factor supplies additional resistance. However, a small cross-section may be achieved in several ways, such as by having a roughly square spoke, i.e., A≈B≈A'≈C, as in the embodiment of Martin's design, with those dimensions appearing to be about 0.375 to 0.5 inch, and specifically stated to be "sharpened" at the tip to further assist penetration. Aside from the sharpened end, Martin's spoke exhibits no increase in cross-section, and therefore no substantial increase in penetration resistance until reaching the spoke base.

Another method of achieving low resistance is by having a relatively thin but broad spoke 26, as in Applicants' invention, wherein the ratio of B to A is approximately 2.3:1 in the preferred embodiment, and within a range of 1:1 to 6:1 generally, and preferably within a range of about 2:1 to 3:1. The ratio of C to A' is approximately 7:1 in the preferred embodiment, and within a range of 3:1 to 15:1 generally, and preferably within a range of about 5:1 to 10:1. In the preferred embodiment of the Applicants' invention, the actual dimensions are about 0.19 inch for A and A', 0.44 inch for B, and 1.3 inches for C, although some minor departure from these values does not seriously compromise the performance of the closing wheel disc 23 in Applicants' experience and testing. Accordingly, Applicants' spoke design may initially enter the soil rather easily, but this ability is diminished gradually along the entire length of the spoke 26 (by the tapering sides 28, as well as friction), which makes controlling its action more manageable.

Other designs have more limited spoke penetration characteristics, as dictated by the geometry of those spokes. The May-Wes "Star" wheel, being the commercial embodiment of Bruns' FIGS. 1 through 4, has ratios of B:A of about 2:1 although C:A' is only about 1.5:1, which is in keeping with the "truncated cone" spoke design specified in Bruns. Perhaps more important are the actual dimensions involved in spokes of the "Star" wheel, which quickly increase from about 0.25 inch for A and 0.38 inch for B, to approximately 1.0 inch for A' and 1.0 inch for C. While the "Star" design has spokes which enter the soil readily near their tip, the rather tremendous increase in thickness near the base of those spokes generally prevents penetration to that depth, except in very loose soil conditions. Also, due to the significant taper in both dimensions, the "Star" wheel has an action in the soil best described as a wedging or prying.

Applicants' invention avoids those problems with a spoke design that creates a distinctive slicing action in the soil. This is accomplished by having relatively small values for both A and A'. However, the edges 28 created by the dimensions A and A' are important for crumbling the sidewall due to the significant tapering of dimensions B to C, as well as the blunt spoke tips 27 and the high total number of spokes 26 on the closing wheel disc 23; all of these surfaces act to break apart the sidewall of the furrow 15 during the wheel's rotation. Accordingly, the value for A and A' should not be too small, preferably in the range of 0.10 to 0.5 inches, and more preferably in the range of 0.12 to 0.3 inches, although the exact action of the closing wheel disc 23 will somewhat depend upon the angles at which it is operated. The ratio of A' to A is preferably less than 3:1, and most preferably about 1:1 (i.e., A≈A'). The dimension C is preferably within the range of 0.8 to 2.7 inches; and the dimension B is preferably within the range of 0.3 to 1.0 inches. The ratio of the dimensions C to B is preferably within the range of about 1.5:1 to 5:1, and most preferably about 3:1. The surface area (i.e., A×B) of the blunt tip 27 is preferably within a range of about 0.03 to 0.5 square inches.

The small value of A' in Applicants' invention is also critical for the wheel disc 23 possessing good ability to shed mud and old crop residues 19 during field operation. This is due to the lack of a large surface against which mud or straw may become lodged, i.e., the thinness of the wheel disc 23 itself allows mud to be continuously pushed inward across the planar edges past the spoke base 29 by the action of incoming soil and residues. This is not the case with the prior art "Star" wheel, which has a spoke base nearly five times as thick as the Applicants' invention, and which is known in the industry to experience major problems with mud accumulation, to the extent of completely filling the spaces between the spokes and eliminating the wheel's functionality. Extensive comparison testing of the Applicants' invention shows major improvements in the ability to shed mud as compared to the prior art "Star" wheel. The Martin patent teaches a wheel with large gaps between the spokes at their base, to ensure that mud and old crop residues can fall away—the practical problems with this approach include the fewer number of spokes that can be placed on a wheel of given size, and the limited ability for the spokes to taper to any significant degree, thereby limiting the wheel's effectiveness at crumbling the sidewall but increasing the spoke's tendency to lift and fling pieces of sidewall.

A further dimension having significant effect on spoke-to-soil interaction is the length of the spoke 26, as depicted as dimension D in FIG. 3. In the Applicants' preferred embodiment, dimension D is of a length of about 1.38 inches. The dimension D is preferably in the range of 0.8 to 1.8 inches, with 1.8 inches being an important upper value to limit the depth of penetration and provide the desired operating characteristics.

Bruns specifies no length of spoke, although the diagrams and the "Star" wheel exhibit a dimension D of about 1.8 inches. Martin, however, specifies a spoke of 2.5 inches, and expressly states the intent in having the spoke engage the soil that full length typically, which it indeed commonly does, as is known in the industry. The problem with such an approach is the spear-like action of such a long slender spoke, which tends to pull up big chunks of sidewall as the spoke exits the soil, and imparts more of a lifting action to those chunks—undoubtedly made worse by Martin's larger wheel diameter and thicker non-tapering spokes. This lifting has undesirable consequences, including less control over how the furrow is filled and greater inconsistency in the amount of fill, less fracture of the sidewall and more large chunks overlying the seed, more air pockets in and around the seed, and a greater likelihood of disrupting seed placement since any lifting of the cohesive sidewall often causes it to fracture at very near the location of the seed. For these reasons, Martin likely saw the need for his "trailing press wheel" all too clearly, although the industry has not moved in this direction and has instead adopted the common practice of placing a seed firming mechanism ahead of the closing wheels rather than behind them.

Figure 4:
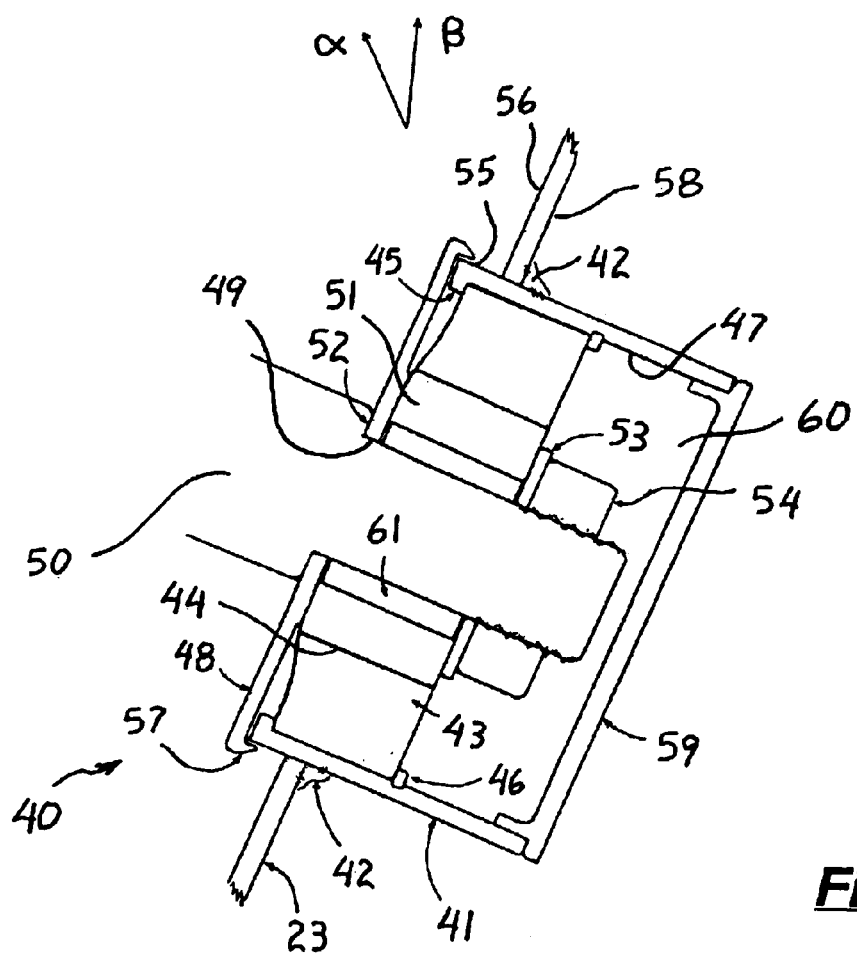
FIG. 4 is a cross-sectional view of an improved mounting system for mounting the closing wheel according to the present invention.
Figure 5:
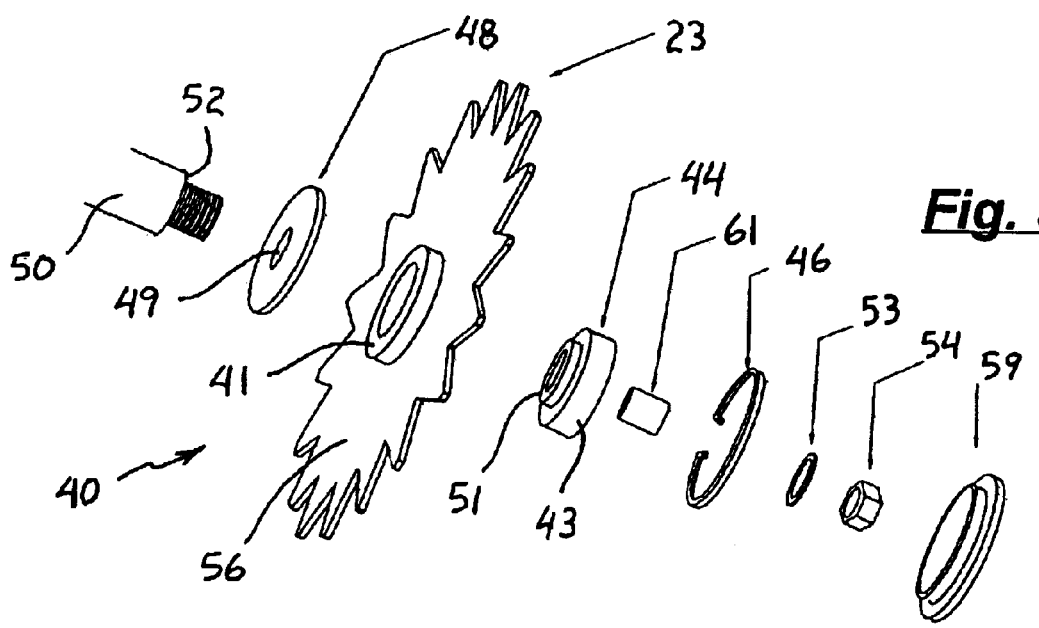
FIG. 5 is an exploded perspective view of the mounting system shown in FIG. 4.

FIGS. 4 and 5 illustrate an improved mounting system 40 according to the present invention that uses a rotatable bearing and shroud arrangement to attach the closing wheel disc 23 to a row unit 10 of an agricultural seeder. The mounting system 40 includes a cup member 41 fixed to the center body portion 25 of the wheel disc 23 by welds 42. The outer race 43 of a heavy-duty mechanical bearing 44 is secured in the cup member 41 by a lip 45 formed on one side of the cup member 41 and by a snap-ring 46 placed in a groove in an inner side 47 of the cup member 41 on the opposite side of the bearing 44.

A shroud 48 protects the bearing 44 from exposure to corrosive liquids. The shroud 48 has a center bore 49 through which a mounting shaft 50, such as a stud or bolt, extends. The shroud 48 is 'sandwiched' between the inner race 51 of the bearing 44 and a shoulder 52 or sleeve (not shown) on the mounting shaft 50, and secured against rotation by a washer 53 and a locknut 54. Thus, the shroud 48 remains stationary during the rotation of the cup member 41, wheel disc 23, and outer race 43 of the bearing 44.

The cup member 41 has a cylindrical exterior surface 55 protruding from an upper side 56 of the wheel disc 23. An important feature of the shroud 48 is the overhanging lip 57, which laps over the protruding cylindrical surface 55 of the cup member 41, and directs liquids away from the juncture of the shroud 48 and the cup member 41. The lip 57 is highly effective at directing liquids away, due to the wheel disc 23 typically being attached to the seeder such that 'up' is in the direction noted in the range of α to β, as well as being due to the centrifugal force resulting from the rotation of the wheel disc 23. The fit between the inner edge of the lip 57 and the outer edge 55 of the cup member 41 is relatively tight in order that vines and crop residues not be able to squeeze into the aperture if such should begin wrapping around the wheel's axis, and to further restrict objects or liquids from passing. Beyond this juncture, the opening between the shroud 48 and the bearing 44 widens to ensure that small accumulations of dust or corrosion do not restrict the rotational movement.

The cup member 41 also protrudes from a lower side 58 of the wheel disc 23. A dust cap 59 is secured to the cup member 41 to close an open lower side 60 of the cup member 41 to ensure that no liquids splatter in from the underside.

Another feature of the invention is the ability to use larger bearings which are known to better withstand sideloads than smaller bearings. Because larger bearings often have centerline bores that are larger than the shoulder 52 or sleeve (not shown) on the mounting shaft 50 of commercially available seeders, it becomes necessary to 'contain' the bearing 44 so that it does not slide over the shoulder 52; the shroud 48 serves this purpose. A spacer 61 is positioned within the inner race 51 and aligns the bearing 44 and cup member 41 so that no drag occurs with the shroud lip 57. In this case, the inner diameters of the center bore 49 and the spacer 61 are sized to fit the shaft 50, while the inner race 51 has a substantially larger inner diameter. The washer 53 acts to contain the spacer 61 as well as the inner race 51 of the bearing 44 against the shroud 48, and the shroud 48 is contained on its other side by the shoulder 52 on the shaft 50.

While the invention has been specifically described in connection with specific embodiments thereof, it is to be understood that this is by way of illustration and not of limitation, and the scope of the appended claims should be construed as broadly as the prior art will permit.

What is claimed is:

1. A furrow closing device for an agricultural seeder, comprising:
   a wheel-shaped structure having a generally planar center body portion and a plurality of spokes extending radially outwardly from the center body portion, said spokes each having a base attached to the center body portion and a blunt tip located radially outwardly of the base;
   wherein said spokes each have a generally triangular shape in plan view, said triangular shape comprising generally flat leading and trailing sides that converge toward each other in a direction of said blunt tip, and said blunt tip extends between respective outer ends of said leading and trailing sides; and
   wherein said spokes each have a thickness in a direction perpendicular to the plane of the wheel-shaped structure which is substantially constant from said blunt tip to said base.

2. The furrow closing device according to claim 1, wherein said blunt tip is defined by a first thickness dimension (A) in a direction perpendicular to a plane of the wheel-shaped structure and a first length dimension (B) in a direction along a circumference of the wheel-shaped structure.

3. The furrow closing device according to claim 1, wherein said blunt tip is located at a truncated vertex of the triangular shape.

4. The furrow closing device according to claim 1, wherein said generally triangular shape of said spokes in plan view is symmetrical about a radial line extending outwardly from the center body portion.

5. The furrow closing device according to claim 2, wherein the ratio of said first length dimension (B) to said first thickness dimension (A) is within a range of about 1:1 to 6:1.

6. The furrow closing device according to claim 2, wherein said base has a second length dimension (C) in a circumferential direction of the wheel-shaped structure, and wherein a ratio of said second length dimension (C) to said first length dimension (B) is within a range of about 1.5:1 to 5:1.

7. The furrow closing device according to claim 6, wherein the ratio of said second length dimension (C) to said first length dimension (B) is about 3:1.

8. The furrow closing device according to claim 1, wherein a surface area of said blunt tip is within a range of about 0.03 to 0.5 square inches.

9. The furrow closing device according to claim 1, wherein said spokes each have a radial dimension (D) from the base to the blunt tip which is less than about 1.8 inches.

10. The furrow closing device according to claim 9, wherein said radial dimension (D) is within a range of about 0.8 to 1.8 inches.

11. The furrow closing device according to claim 1, wherein said plurality of spokes comprise at least fourteen spokes extending radially outwardly from the center body portion.

12. The furrow closing device according to claim 1, wherein said wheel-shaped structure is formed of a substantially flat plate having a constant thickness from said center body portion to the blunt tips of said spokes.

13. The furrow closing device according to claim 1, wherein said blunt tip of each spoke is defined by a first thickness dimension (A) in a direction perpendicular to a plane of the wheel-shaped structure and a first length dimension (B) measured along an outer surface of the spoke between points where the outer surface lies more in a circumferential direction than in a radial direction.

14. The furrow closing device according to claim 13, wherein said substantially constant thickness of said spokes is within a range of 0.12 to 0.3 inches.

15. A furrow closing device attached to a row unit of an agricultural seeder behind a furrow opener and a seed-directing structure, the furrow closing device being arranged to close a furrow formed by the furrow opener after seeds are delivered into the furrow through the seed-directing structure, the furrow closing device comprising:

a wheel-shaped structure having a center body portion and a plurality of spokes extending radially outwardly from the center body portion, said spokes each having a base attached to the center body portion and a blunt tip located radially outwardly of the base, said blunt tip being defined by a first thickness dimension (A) in a direction perpendicular to a plane of the wheel-shaped structure and a first length dimension (B) in a direction along a circumference of the wheel-shaped structure, the ratio of said first length dimension (B) to said first thickness dimension (A) being within a range of about 1:1 to 6:1;

wherein said spokes each have a generally triangular shape in plan view, said triangular shape comprising generally flat leading and trailing sides that converge toward each other in a direction of said blunt tip, and said blunt tip extends between respective outer ends of said leading and trailing sides; and wherein said spokes each have a thickness in a direction perpendicular to the plane of the wheel-shaped structure which is substantially constant from said blunt tip to said base.

16. The furrow closing device according to claim 15, wherein said base of each spoke has a second length dimension (C) in a circumferential direction of the wheel-shaped structure, and wherein a ratio of said second length dimension (C) to said first length dimension (B) is within a range of about 1.5:1 to 5:1.

17. The furrow closing device according to claim 15, wherein a surface area of said blunt tip of each spoke is within a range of about 0.03 to 0.5 square inches.

18. The furrow closing device according to claim 15, wherein said spokes each have a radial dimension (D) from the base to the blunt tip which is within a range of about 0.8 to 1.8 inches.

19. The furrow closing device according to claim 15, wherein the ratio of said first length dimension (B) to said first thickness dimension (A) is within a range of about 2:1 to 3:1.

20. An agricultural seeder having a furrow closing device attached to a row unit behind a furrow opener and a seed-directing structure, the furrow closing device being arranged to close a furrow formed by the furrow opener after seeds are delivered into the furrow through the seed-directing structure, the furrow closing device comprising:

a wheel disc having a planar body portion and a plurality of spokes extending radially outwardly from the planar body portion, said spokes each having a base attached to the planar body portion and a blunt tip located radially outwardly of the base;

said spokes each having a thickness in a direction parallel to an axis of rotation of the wheel disc which is substantially constant from said blunt tip to said base;

said spokes each having a generally triangular shape in plan view, said triangular shape comprising generally flat leading and trailing sides that converge toward each other in a direction of said blunt tip, and said blunt tip extends between respective outer ends of said leading and trailing sides;

the blunt tip of each spoke being defined by a first thickness dimension A in a direction parallel to an axis of rotation of the wheel disc and a first length dimension B in a direction along a circumference of the wheel disc, the ratio of said first length dimension B to said first thickness dimension A being within a range of about 1:1 to 6:1;

the base of each spoke having a second length dimension (C) in a circumferential direction of the wheel disc, wherein a ratio of said second length dimension (C) to said first length dimension (B) is within a range of about 1.5:1 to 5:1; and said spokes each having a radial dimension (D) from the base to the blunt tip which is within a range of about 0.8 to 1.8 inches.

21. The agricultural seeder according to claim 20, wherein the furrow closing device is attached to the row unit by a mounting system comprising:

a cup member fixed to a center portion of the wheel disc, the cup member having a cylindrical exterior surface protruding from an upper side of the wheel disc;

a mechanical bearing having an outer race secured to an inner side of the cup member for rotation with the wheel disc, and an inner race secured to a shaft on which the wheel disc is mounted;

a shroud having a substantially circular outer periphery and an overhanging lip extending around the outer periphery, said overhanging lip having an inner edge sized to fit closely about the cylindrical exterior surface of the cup member, the shroud further comprising a center bore through which the shaft extends; and a means for securing the inner race and shroud to the shaft such that the cup member is rotatable relative to the shroud, whereby the shroud restricts liquids and objects from passing from the upper side of the wheel disc into the interior of the cup member.

22. A furrow closing device for an agricultural seeder, comprising:

a wheel-shaped structure having a generally planar center body portion and a plurality of spokes extending radially outwardly from the center body portion, said spokes each having a base attached to the center body portion and a blunt tip located radially outwardly of the base;

wherein said spokes each have a generally triangular shape in plan view, said triangular shape comprising generally flat leading and trailing sides that converge toward each other in a direction of said blunt tip, and said blunt tip extends between respective outer ends of said leading and trailing sides; and wherein said spokes each have a first thickness dimension (A) at the blunt tip in a direction perpendicular to the plane of the wheel-shaped structure and a second thickness dimension (A') at the base in a direction perpendicular to the plane of the wheel-shaped structure, a ratio of said second thickness dimension (A') to said first thickness dimension (A) is less than 3:1, and said first and second thickness dimensions (A and A') are within a range of 0.1 to 0.5 inches.

23. The furrow closing device according to claim 22, wherein the ratio of said second thickness dimension (A') to said first thickness dimension (A) is about 1:1.

* * * * *